United States Patent
Ito et al.

(10) Patent No.: US 6,946,009 B2
(45) Date of Patent: Sep. 20, 2005

(54) CERIUM-BASED ABRASIVE MATERIAL AND ABRASIVE MATERIAL SLURRY, AND METHOD FOR PRODUCING CERIUM BASED ABRASIVE MATERIAL

(75) Inventors: Terunori Ito, Tokyo (JP); Naoyoshi Mochizuki, Tokyo (JP); Kazuya Ushiyama, Tokyo (JP); Hiroyuki Watanabe, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/467,307

(22) PCT Filed: Mar. 8, 2002

(86) PCT No.: PCT/JP02/02170

§ 371 (c)(1), (2), (4) Date: Aug. 6, 2003

(87) PCT Pub. No.: WO02/072726

PCT Pub. Date: Sep. 19, 2002

(65) Prior Publication Data

US 2004/0154229 A1 Aug. 12, 2004

(30) Foreign Application Priority Data

Mar. 9, 2001 (JP) ........................................ 2001-065952

(51) Int. Cl.$^7$ ................................................. C09K 3/14
(52) U.S. Cl. ............................ 51/307; 51/309; 423/263
(58) Field of Search ..................... 51/307, 309; 106/3; 423/263

(56) References Cited

U.S. PATENT DOCUMENTS

| | | | |
|---|---|---|---|
| 5,766,279 A | 6/1998 | Ueda et al. | |
| 6,299,659 B1 * | 10/2001 | Kido et al. | 51/309 |
| 6,534,044 B1 * | 3/2003 | Wada et al. | 424/59 |
| 6,730,245 B2 * | 5/2004 | Hampden-Smith et al. | 264/7 |

FOREIGN PATENT DOCUMENTS

| | | |
|---|---|---|
| EP | 874036 A1 | 10/1998 |
| JP | 2000-265160 A | 9/2000 |
| JP | 2001-284296 A | 10/2001 |
| WO | WO 00/08678 A1 | 2/2000 |

* cited by examiner

Primary Examiner—Michael Marcheschi
(74) Attorney, Agent, or Firm—Rothwell, Figg, Ernst & Manbeck, P.C.

(57) ABSTRACT

There is provided a cerium-based abrasive containing cerium oxide as a main component, in which the abrasive particles composing the abrasive are coated with a coating layer containing at least either one of a silicon component of silicon or a silicon compound and an aluminum component of aluminum or an aluminum compound. The cerium-based abrasive can be produced by wet-dispersing the cerium-based abrasive in a dispersion medium to obtain a slurry and carrying out surface treatment by adding a treatment solution containing at least either one of the silicon compound and the aluminum compound to the slurry. Further, the cerium-based abrasive can be produced by carrying out surface treatment by adding a treatment solution containing at least either one of the silicon compound and the aluminum compound to the slurry during the pulverization step or after the pulverization step in the conventional cerium-based abrasive production process and after that roasting and classifying the obtained cerium-based abrasive.

8 Claims, No Drawings

CERIUM-BASED ABRASIVE MATERIAL AND ABRASIVE MATERIAL SLURRY, AND METHOD FOR PRODUCING CERIUM BASED ABRASIVE MATERIAL

CROSS REFERENCE TO RELATED APPLICATION

This application is a 35 USC § 371 National Phase Entry Application from PCT/JP02/02170, filed Mar. 8, 2002, and designating the U.S.

FIELD OF THE INVENTION

The present invention relates to a cerium-based abrasive. More particularly, the invention relates to a cerium-based abrasive with high fluidity and dispersibility and excellent in polishing properties.

BACKGROUND OF THE ART

The range of the use of a cerium-based abrasive containing cerium-based particles as a main component has rapidly been increasing owing to the excellent polishing effects and the functions of a variety of additives added to the abrasive. Today, it is employed not only for a conventional purpose of polishing optical glass but for the fields of polishing glass for a liquid crystal, glass for a magnetic recording medium such as hard disks, and fabricating an electronic circuit such as LSI.

The cerium-based abrasive has generally been produced by the following method. That is, raw materials are made to be a slurry, wet-pulverized, treated with a mineral acid as required, and then subjected to chemical treatment with hydrofluoric acid, ammonium fluoride, and the like. The obtained slurry is filtered, dried, and roasted, the resulting particle is then pulverized and classified to obtain an abrasive particle having a desired particle diameter. Rare earth raw materials such as rare earth carbonates, rare earth hydroxides, rare earth oxalates, or rare earth oxides obtained by firing these compounds are used as the raw materials of the cerium-based abrasive.

These rare earth raw materials have been produced generally by removing some rare earth metals (Nd, Pr, etc.) and radioactive elements from bastnasite-based rare earth raw materials or cerium-containing rare earth raw materials by a well-known chemical treatment.

The cerium-based abrasive is assumed to have a high polishing speed and further is required to produce a polished face with excellent specular properties. Although these properties are required not only for cerium-based one but also for an abrasive generally, the cerium-based one is required to be excellent in the polishing properties and to be improved in other properties as well.

For example, the cerium-based abrasive is generally dispersed in a dispersion medium such as water and mixed with a dispersant, a pH adjusting agent, and the like, as required, and then supplied to a polishing apparatus. Consequently, it is important for a dried abrasive particle powder to be quickly dispersed in water and to become an even slurry.

Further, the adhesive property of the abrasive particles to the surface of an object to be polished is also important. This is because the object to be polished is to be washed after polishing and if the adhesive property of the abrasive particles is high, the abrasive particles remain on the surface of the object to be polished after washing. Hence, the remaining abrasive particles may sometimes become causes of scratches in handling thereafter. Further, if the object to be polished is a substrate for a hard disk, the existence of the remaining particles becomes causes of deterioration of the smoothness in the case where a magnetic material is vaporized and deposited after polishing.

As the measures to satisfy such various requirements, in terms of the improvement of the polishing properties, in addition to improvements of an abrasive, various amendments of additives to a slurry, an abrasive pad, a polishing apparatus and the like have been performed. However, in terms of the improvement of the dispersibility and the adhesive property, in many cases, additives have been employed to meet such a requirement based on their functions, yet any satisfactory countermeasures to satisfy the requirement for the improvement of the abrasive particles themselves have not been proposed and no abrasive particle excellent both in the polishing properties and the dispersibility has been proposed. Especially, regarding the cerium-based abrasive, abrasive particles with an extremely small particle diameter of 1 $\mu$m or smaller, further 0.5 $\mu$m or smaller, have been employed in order to realize highly excellent surface smoothness and specular property, whereas it is supposed that the dispersibility and the adhesive property are deteriorated in relation to the surface energy if the particle diameter of particles becomes fine. However, no countermeasures against it have not yet been performed.

The invention has been developed under the above described situation and aims to provide a cerium-based abrasive excellent in the polishing capability and the polishing precision and also excellent in the dispersibility and other properties.

DISCLOSURE OF THE INVENTION

In order to solve such problems and find a cerium-based abrasive having a property which abrasives are supposed to have, that is, excellent polishing capability, the inventors of the present invention have reviewed and made investigations into the causes of scratches occurring at the time of polishing. To classify the matter of the polishing scratches, the scratches caused at the time of polishing can widely be divided into so-called polishing scratches attributed to the existence of coarse particles and fine scratches smaller than the polishing scratches and caused on the final polished surface.

According to the investigation of the causes of the occurrence of these two types of scratches, at first, the polishing scratches are attributed to the existence of coarse particles in an abrasive slurry. The existence of the coarse particles is supposedly mainly attributed to abnormal particle growth of the small abrasive particles during a roasting step among the production steps of the abrasive particles and in addition to that, the existence is also supposedly attributed to the fact that particles with high agglomerating force in a dry state are insufficiently dispersed when the dry particle powder is made to be an abrasive slurry after production and consequently forming coarse particles in the slurry.

On the other hand, the cause of the occurrence of the fine scratches is supposedly related to the relation between the abrasive particles and an object to be polished. Because an object to be polished for the uses for which the cerium-based abrasive is employed is, in many cases, of a different kind of materials containing silicon and aluminum as a main component. In case of polishing such a different material, fine particles of the object abraded by polishing are physically and chemically adsorbed on the abrasive particles and partially converged. The abrasive particles to which fine particles of the object are adsorbed abnormally agglomerate and the resulting agglomerates abrade the object again, resulting in the occurrence of the scratches.

Based on the above-described considerations, in order to obtain a cerium-based abrasive with high precision and causing no scratch, it is required to prevent abnormal particle growth in the production steps. Further, in addition to that, it is also required for the abrasive to reduce agglomerating force in a dry state and high dispersibility in a dispersion medium and to be kept in a dispersed state without causing abnormal agglomeration owing to the adsorption of the particles of the object to be polished. This means that an abrasive with excellent polishing properties is excellent in dispersibility.

Further, based on the results of the enthusiastic investigations, the inventors of the present invention come to have the conception that coating of the surface of abrasive particles with a silicon component or an aluminum component may be effective as a measure to reduce the agglomerating force of the abrasive particles in a dry state and achieve the present invention. That is, the invention is a cerium-based abrasive composed of cerium oxide as a main component, in which abrasive particles of the cerium-based abrasive are coated with a coating layer containing at least either one of a silicon component of silicon or an inorganic silicon compound and an aluminum component of aluminum or an inorganic aluminum compound.

In the invention, the coating with a silicon component or an aluminum component means a coating not so easily desorbed from the surface of the abrasive particles and existing evenly on the particle surface because the silicon component or the aluminum component is not only physically mixed with or adhering to the abrasive particles but also has a certain chemical bond with them.

Further, in the invention, the coating layer on the particle surface may be a single layer in which both components, the silicon component and the aluminum component, are mixed, and may be of a double layer structure with a combination of a layer of the silicon component and a layer of the aluminum component. In the case where the coating layer forms the double coating layer structure, the lower layer and the upper layer may be respectively of the silicon component and the aluminum component or the lower layer and the upper layer may be respectively of the aluminum component and the silicon component, and they may properly be selected depending on the material of an object to be polished and the polishing conditions.

The cerium-based abrasive according to the invention has a weak agglomerating force in a dry state and is excellent in the dispersibility in a dispersion medium. At the same time, it scarcely causes abnormal agglomeration attributed to adsorption of fine particles of the object at the time of polishing. The reason why such properties are provided by the coating of the surface of the particles of the cerium-based abrasive with the silicon component or the aluminum component is not necessarily manifest, however inventors of the invention think that the coating layer on the surface of the abrasive particles takes a role like a spacer to decrease the agglomerating force in a dry state.

Further, the abrasive with such a coating is prevented from the abnormal particle growth at the time of roasting if the coating is formed before the roasting and therefore the abrasive is free from coarse particles. The effect to prevent the abnormal particle growth is also supposedly attributed to the role like a spacer of the coating layer and consequently, existence of the coarse particles in the produced abrasive can be suppressed to obtain an abrasive having excellent polishing properties.

Moreover, owing to the function like a spacer of the coating layer, the cerium-based abrasive according to the invention is provided with an effect to decrease the adhesive property to the object to be polished. That is, the abrasive particles of the cerium-based abrasive according to the invention can be desorbed from the surface of the object without remaining by washing after polishing. The cerium-based abrasive with low adhesive property according to the invention has no probability of causing scratches after polishing and is capable of reliably providing smoothness of a product.

The content of the silicon component or the aluminum component contained in the coating layer is desirably 0.01 to 5% by weight in total of silicon element and aluminum element to the weight of the abrasive particles.

The range is preferably 0.05 to 3% by weight, more preferably 0.1 to 2% by weight. If less than 0.01% by weight, no effect expected in the invention can be obtained, and if more than 5% by weight, although effects of preventing sintering and of improving the dispersibility are provided, uniform coating treatment becomes difficult and thus the coating component is present alone other than on the surface of the particles of the cerium-based abrasive, which may adversely affect polishing evaluation.

The atomic content ratio (Si/Al) of both components in the case where both silicon component and aluminum component are added to the coating layer is preferably 0.1 to 10, more preferably 0.5 to 5, in the case where the coating layer is a single layer. On the other hand, in the case of the double layer structure, the atomic ratio of Si/Al as the ratio of the layer of the silicon component and the layer of the aluminum component composing the coating layer is preferably 0.1 to 10, more preferably 0.3 to 3. Further, in either case, it is preferable that the coating quantity of aluminum atom is equal to or more than the coating quantity of silicon atom in order to prevent sintering and to improve the dispersibility.

Detailed investigations into the cerium-based abrasive coated with the coating on the surface which inventors of the invention have conducted and clarified that the abrasive particles of the cerium-based abrasive have a small angle of repose. From that finding, the powder of the cerium-based abrasive according to the invention is supposed to be excellent in the fluidity as well. It has advantages that clogging of the pipes in the case of pneumatic transportation is suppressed and adhering to and bridging in a storage hopper are prevented. Further, adhesion of the powder to a classifying apparatus can be suppressed by forming the coating layer before a classifying step to improve the classification efficiency. Incidentally, in the invention, the angle of repose of the powder is preferably small and desirably 60 degrees or smaller. Further, the value is preferably 55 degrees or smaller, more preferably 50 degrees or smaller. Although the angle of repose differs depending on the thickness of the coating layer, the angle of repose becomes 60 degrees if the total content of silicon element and aluminum element is 0.01% by weight to the weight of the abrasive particles and it becomes smaller as the total content increases more and becomes 50 degrees or smaller if the total content is 5% by weight.

Further, the cerium-based abrasive according to the invention has excellent dispersibility and fluidity by itself as described above and is provided with specified characteristics by being subjected to surface treatment. For example, the abrasive according to the invention is provided with water-repelling property by adding a fatty acid treating agent such as oleic acid, stearic acid and a treating agent such as silicon oil, an organic fluorine compound. Further, fluidity can be improved with a fluidizing agent containing a silicon-based or a fluorine-based compound, and in addition the charging property and the dispersibility in wet state can be adjusted by proper surface treating agents. In case of attaching importance to the fluidity, the cerium-based abrasive according to the invention has desirably a coupling treatment agent layer produced from a coupling agent on the surface of the coating layer. This is because a coupling agent is rich in the reactivity with hydroxyl group and a coupling agent is the most suitable among surface treatment agents to treat a hydroxyl group which is supposed to exist in a large quantity on the surface of the abrasive of the invention bearing a coating layer containing the silicon component or the aluminum component as compared with a hydroxyl group existing on the abrasive surface having no coating layer. Formation of such a coupling treatment agent layer can lower the angle of repose, resulting in an abrasive with excellent fluidity. Examples of the coupling agent capable of forming the coupling treatment agent layer include a silane coupling agent, an aluminum coupling agent, a zirconia coupling agent, and a titanate coupling agent and the layer may be formed using at least one kind of these coupling agents. This is because these coupling agents have high reactivity to hydroxyl group and have been used as an additive to improve the fluidity and the lubricating property of a powder. The cerium-based abrasive particles according to the invention coated with a layer formed using, for example, a silane coupling agent have a smaller angle of repose by at least 5 degree than ones bearing only a coating layer.

Incidentally, the particle diameter of the particles of the cerium-based abrasive bearing the coating layer on the particle surface is not particularly restricted, but the average particle diameter is preferably 0.1 to 10 $\mu$m, more preferably 0.2 to 5 $\mu$m by micro-track measurement. If the value is smaller than 0.1 $\mu$m, a practical polishing speed is hard to obtain, and if higher than 10 $\mu$m, a large number of polishing scratches are caused and such an abrasive cannot be employed for precision polishing.

The cerium-based abrasive in the invention means not only the particles themselves but also a powder of the particle agglomerates. Further, the abrasive slurry containing the cerium-based abrasive particles can be prepared by dispersing the abrasive as a medium to be dispersed in a dispersion medium and regarding additives having a dispersing function and a cleaning function to the dispersion medium, well-known substances may optionally be employed.

Further, in the case where the cerium-based abrasive bearing the coating containing the silicon component and the aluminum component on the particle surface is used to produce a cerium-based abrasive slurry, a dispersion slurry using water as the dispersion medium is preferably the abrasive slurry. Further, it is also optional to produce a slurry containing a variety of additives such as a dispersing agent and a surfactant in combination based on the purposes for polishing.

As described above, the cerium-based abrasive according to the invention has excellent polishing properties while keeping excellent dispersibility and the fluidity and is suitable as an abrasive for polishing various glass materials. Also, the cerium-based abrasive according to the invention contains the silicon component and the aluminum component on the surface and these components have charging properties to be respectively negative and positive. Further, the cerium-based abrasive according to the invention is easy to surface-treat and therefore, the charging property is also adjustable. Consequently, the cerium-based abrasive according to the invention can be used as an additive for a developer for electrostatic latent image development to be used for the electrophotography as well as general glass polishing. For example, in a development apparatus for which an amorphous silicon is employed as a photosensitive conductor, addition of the cerium-based abrasive according to the invention to a developer keeps the surface of the photosensitive conductor clean and improves the development properties such as stability of the image density.

Further, the cerium-based abrasive according to the invention is provided with a prolonged life by the coating and such tendency is particularly prominent for those bearing the coating containing the aluminum component.

Next, the production method of the cerium-based abrasive according to the invention, that is, a method for forming the coating layer on the abrasive particles will be described. As a method for coating the abrasive particles with the silicon component and the aluminum component, a dry type coating treatment may be carried out, in other words, the cerium-based abrasive as a raw material powder before roasting or the cerium-based abrasive powder after roasting is mixed with a fine powder of colloidal silica, colloidal alumina, and the like.

In this case, the average particle diameter (D50) of silicon, a silicon compound, aluminum, or an aluminum compound is properly not larger than $\frac{1}{3}$, preferably not larger than $\frac{1}{5}$, and further preferably not larger than $\frac{1}{10}$ of that of the cerium-based abrasive as a raw material powder before roasting or the cerium-based abrasive powder after roasting. This is because if it exceeds $\frac{1}{3}$, mixing state, rather than coating, will take place and it becomes impossible to sufficiently coat the abrasive particles.

Incidentally, in case of carrying out coating treatment for the cerium-based abrasive powder after roasting, it is preferable to carry out heating treatment at a temperature not lower than 200° C. and not higher than the roasting temperature after the raw material powder is mixed with colloidal silica and the like. The heating treatment is carried out because no complete coating can be formed only by simply mixing the abrasive powder with the colloidal silica and the like and the silicon component and the aluminum component are consequently dropped off. The heating treatment temperature is controlled to be not lower than 200° C. in order to prevent the silicon component and the aluminum component from dropping off. On the other hand, the heating treatment temperature is controlled to be not higher than the roasting temperature in order to suppress the proceeding of sintering of the abrasive particles.

Meanwhile, as the method for forming an even and firm coating layer, a method preferably comprises steps of producing a slurry by wet-dispersing the cerium-based abrasive in a dispersion medium and adding a treatment solution containing at least either one of a silicon compound and an aluminum compound to be slurry. Consequently, the surface of the cerium-based abrasive particles is easily and evenly coated with the silicon component and the aluminum component and at the same time, the formed coating layer is firm enough to eliminate dropping of these components during use.

The coating layer formed on the surface of the abrasive particles in the invention has effects not only to suppress the agglomeration in a dry state but also to suppress the abnormal particle growth at the time of roasting. Consequently, in order to obtain the cerium-based abrasive excellent in the polishing properties, it is preferable to form the coating layer on a previously pulverized raw material and subject the resulting raw material to common treatment steps to obtain the abrasive, instead of coating treatment carried out for the completed cerium-based abrasive. That is, in a common production method comprising a slurry production step of producing a slurry by mixing the abrasive raw material with a dispersion medium to obtain a slurry of the abrasive raw material, a pulverization step of wet-pulverizing the slurry, a roasting step of roasting the abrasive raw material after pulverization, and a classification step of classifying the roasted abrasive raw material after the raw material is dry-pulverized, it is preferable to carry out the coating treatment by adding a treatment solution containing either one of the silicon compound and the aluminum compound to the slurry during the pulverization step or after the pulverization step.

In this case, as the dispersion medium to make a slurry of the abrasive particles or the abrasive raw material at the time of carrying out the coating treatment, although organic solvents such as alcohols and hydrocarbon-based solvents can be employed, it is preferable to use water as a main component for the dispersion medium in consideration of the possible problems such as ignition in terms of work safety. The concentration of the abrasive or the raw material in the slurry is preferably within a range of 5 to 50% by weight to carry out the treatment. This is because if the concentration is lower than 5% by weight, the slurry is too thin, resulting in a decrease of the productivity, and if the concentration is higher than 50% by weight, the viscosity of the slurry is increased and the slurry becomes difficult to stir and therefore uniform coating treatment possibly becomes difficult. Especially, in case of carrying out surface treatment for the cerium-based abrasive after classification, by controlling the slurry concentration in the above-described range, the slurry after the surface treatment can conveniently be employed as a slurry for polishing as it is. Further, as a method for making the abrasive or the raw material be a slurry, the powder-state or cake-like abrasive or raw material is re-pulped with the dispersion medium to be a slurry and based on necessity, an apparatus such as a stirring apparatus, an ultrasonic dispersing apparatus, a homogenizer, a homo-mixer and the like is employed.

On the other hand, as the silicon compound and the aluminum compound to be added to the abrasive or the raw material in the slurry state, powders of fine particles of such as colloidal silica and colloidal alumina may be added as they are or being made to be a slurry, however in this case also, coated fine particles may be dropped off or uniform coating cannot be formed. Consequently, regarding the compound to be added, it is preferable to use compounds soluble in the abrasive slurry. Especially, as described above, water is preferably the main component as the dispersion medium in the invention and for that, the silicon component and the aluminum component to be added in this case are desirably water-soluble. As the water-soluble silicon component, sodium silicate, potassium silicate and the like are usable and as the water-soluble aluminum component, aluminum sulfate, aluminum chloride, sodium aluminate and the like are usable. Also, in case of adding the silicon compound and the like before the roasting step, an organic compound for the silicon component and the like is usable if it can be converted into an inorganic compound by roasting.

In the invention, in order to evenly and firmly coat the surface of the abrasive particles or the abrasive raw material with the silicon component and the aluminum component,
pH is preferably adjusted during addition or after addition of the silicon component and the aluminum component to the abrasive slurry. The pH is preferably adjusted within a range of 2 to 10. This is because at pH out of the pH range, the silicon component and the aluminum component of the coating on the surface of the particles are dissolved to give no sufficient effect of the coating. Execution of the pH adjustment makes it possible to form an even and firm coating of the silicon component and the aluminum component as compared with the case of simply physically mixing them.

As the pH adjustment method, during the addition or after the addition of the silicon component and the aluminum component to the slurry, aqueous acidic and alkaline solutions may be added so as to keep pH in a prescribed range. In this case, the addition speed of the silicon component and the aluminum component is not particularly restricted and they may be added evenly in the entire slurry while being stirred. Further, five minutes or longer is sufficient for the time to keep the pH of the slurry after addition.

In case of previously forming the coating layer on the raw material in the pulverization step, the raw material slurry after the treatment is subjected to filtering, washing, drying, roasting, pulverizing, and classifying steps by common methods to obtain a powder of the cerium-based abrasive particles. The roasting temperature at that time is 700 to 1,200° C. and the retention time is 30 minutes to 24 hours. The classification may be carried out for removing particles with a particle diameter of 10 $\mu$m or larger. Further, in order to prevent damages on the surface coating layer by carbonic acid gas evolved in the inside by the roasting carried out after the surface treatment, as the powder to be coated, rare earth oxides are preferable rather than rare earth carbonates and more practically, the content of the volatile components such as carbonic acid gas and the like at the roasting temperature is not more than 25% by weight relative to the entire weight of the powder of the abrasive particles before coating.

On the other hand, as the method for forming a coupling treatment agent layer on the cerium-based abrasive bearing the coating layer produced by the above-described method, the cerium-based abrasive produced by the above-described method is mixed with a coupling agent and heated to cause the coupling reaction. The mixing of the cerium-based abrasive with the coupling agent may be carried out by a mixer by adding the coupling agent to the cerium-based abrasive in powder state and also by dispersing the cerium-based abrasive in water or an organic solvent to obtain a slurry and adding the coupling agent to the obtained slurry. The mixing amount of the coupling agent is preferably 0.1 to 5% by weight in relation to the weight of the cerium-based abrasive. This is because if it is less than 0.1% by weight, the treatment effect on the abrasive is slight and if it is higher than 5% by weight, the coupling treatment agent layer becomes too thick and therefore the coupling component is easy to drop off and changes the properties of the abrasive slurry during polishing.

As the coupling agent to be employed for the treatment, usable examples are a silane coupling agent, an aluminum coupling agent, a zirconia coupling agent, a titanate coupling agent, and the like.

BEST MODE FOR CARRYING OUT THE INVENTION

Hereinafter, together with Comparative Examples, preferred embodiments of the present invention will be described.

First Embodiment

A bastnasite-based cerium oxide raw material was used and loaded together with water into an attriter (manufactured by Mitsui Mining Co., Ltd.) and pulverized to have the average particle diameter of 0.3 µm by a particle diameter measurement method which will be described later. After the slurry was transported to a receiving tank equipped with a stirring apparatus from the attriter, an aqueous sodium silicate solution measured so as to contain silicon in 1% by weight in relation to the cerium oxide weight was added while being stirred. After the resulting slurry was stirred for 5 minutes after addition, the pH was adjusted to be 8 by a diluted sulfuric acid and controlled to keep the pH for 30 minutes. The obtained slurry was filtered, dried, roasted at 950° C. and pulverized and then the particles with a particle diameter of 10 µm or larger were removed to obtain a powder of the cerium-based abrasive particles. The quantity of the silicon component coating on the surface of the particles was measured by the following method and then the particle size measurement and the dispersibility test were carried out and a glass material was polished to evaluate the polishing properties.

<Particle Diameter Measurement>

A powder of the abrasive particles in amount of 0.1 g was put in 100 ml of an aqueous solution of 0.1% by weight of sodium hexametaphosphate and dispersed for 10 minutes at 300 W by an ultrasonic homogenizer (MODEL US-300T, manufactured by Nippon Seiki Manufacturing Co., Ltd.). Some of the resulting dispersion solution was sampled and the particle size distribution was measured by micro-track (Micro-Track MK-II, particle size analyzer SPA MODEL 7997-20, manufactured by Nikkiso Co., Ltd.). Based on the obtained data, the particle diameter value (µm) of 50% in the volumetric particle size distribution degree from the small particle diameter side was defined as the average particle diameter.

<Component Measurement of the Coating Layer>

A powder of abrasive particles in amount of 1 g was added to 100 ml of an aqueous solution of 1 mol/l of NaOH and stirred for 4 hours by a magnetic stirrer while being kept at 50° C. temperature. The obtained slurry was filtered by filtration paper to separate a powder and the solution was diluted to 200 ml with pure water and the silicon and aluminum contents were quantitatively measured by ICP and conversion calculation was carried out based on the initial weight of the powder of the abrasive particles to quantitatively measure the amounts of the silicon component and the aluminum component in the coating layer.

<Dispersibility Test>

A powder of abrasive particles in amount of 0.1 g was added to 100 ml of pure water and dispersed by an ultrasonic homogenizer while changing the time to be 1 minute, 2 minutes and so forth and the time taken to obtain the particle diameter value of 10 µm or smaller (micro-track) for 90% in the volumetric particle size distribution degree from the small particle diameter side was defined as the needed dispersion time. Consequently, if the needed dispersion time was short, the abrasive was judged to be excellent in dispersibility.

<Polishing Test>

Employing an Oscar type polishing tester (HSP-2I Model, manufactured by Taito Seiki Co., Ltd.) as the testing apparatus and using a polishing pad made of a polyurethane and glass for a flat panel of 60 mm φ as an object to be polished, polishing was carried out for 5 minutes by supplying a slurry of 10% by weight of the abrasive produced by mixing the above-described abrasive and pure water at a speed of 500 ml/minute while setting the pressure to the face to the polished at 500 g/cm² and the rotation speed of the polishing apparatus at 1,100 rpm. The glass after the polishing was washed with flowing pure water, subjected to the ultrasonic washing in pure water for one minute, further washed with flowing pure water, and dried in dust-free condition. Incidentally, washing the glass after polishing was carried out only with flowing water without the ultrasonic washing and the remaining amount of the abrasive particles was compared with that in the case of carrying out the ultrasonic washing.

<Abrasive Life Test>

Further, in order to investigate the durability of an abrasive in long time use, a life test was carried out. Using the same polishing apparatus as that for the polishing test, the life test was carried out by carrying out polishing 100 objects to be polished while circulating 5 L of the slurry of 10% by weight of the abrasive and the polishing values for the first object, the 20th object, the 50th object, and the 100th object were measured.

The evaluation by the life test was carried out for the abrasives of the first embodiment, the second embodiment, and Comparative Example 1, which will be described later.

Incidentally, to evaluate the polishing values in the polishing test and the life test, the polishing values were calculated by measuring the decrease of the weight of the glass before and after polishing and calculating the relative values of the decrease when the decrease of the comparative example, which will be described later, was set to be 100. Further, regarding the existence of the scratches in the polished surface and the existence of remaining and adhering abrasive particles, they were observed by a reflection method by radiating light rays from a halogen lamp of 300,000 lux as a light source to the surface of the glass after polishing. Regarding the scratches, the degree and the number of the scratches were observed and marked and evaluation was performed by demerit mark way on the basis of 100 points. On the other hand, the existence of the abrasive remaining on the glass surface was confirmed by observing the polished face with an optical microscope.

The results of the particle size measurement, the dispersibility measurement, and the polishing test are shown in Table 1. Further, the results of the life test are shown in Table 2.

Second Embodiment

In this embodiment, a cerium-based abrasive coated with aluminum in place of silicon in the first embodiment was produced. After the bastnasite-based cerium oxide raw material was pulverized to have the average particle diameter of 0.3 µm in the same manner as the first embodiment, an aqueous aluminum sulfate solution measured so as to contain aluminum in 1% by weight in relation to the cerium oxide weight was added to the produced slurry while being stirred. After the resulting slurry was stirred for 5 minutes after addition, the pH was adjusted to be 6 by an aqueous NaOH solution and controlled to keep the pH for 30 minutes. The obtained slurry was filtered, dried, roasted at 950° C. and pulverized and then the particles with a particle diameter of 10 µm or larger were removed to obtain a powder of the cerium-based abrasive particles. The obtained powder of the cerium-based abrasive particles was evaluated in the same manner as the first embodiment and the obtained results are shown in Table 1. Further, the results of the life test are shown in Table 2.

Third Embodiment

In this embodiment, a cerium-based abrasive coated with both silicon and aluminum was produced. After the bastnasite-based cerium oxide raw material was pulverized to have the average particle diameter of 0.3 μm in the same manner as the first embodiment, an aqueous sodium silicate solution measured as to contain silicon in 0.3% by weight in relation to the cerium oxide weight and an aqueous sodium aluminate solution measured so as to contain aluminum in 0.3% by weight were added to the produced slurry while being stirred. After the resulting slurry was stirred for 5 minutes after addition, the pH was adjusted to be 6 by a diluted sulfuric acid and controlled to keep the pH for 30 minutes. The obtained slurry was filtered, dried, roasted at 950° C. and pulverized and then the particles with a particle diameter of 10 μm or larger were removed to obtain a powder of the cerium-based abrasive particles. The obtained powder of the cerium-based abrasive particles was evaluated in the same manner as the first embodiment and the obtained results are shown in Table 1.

Fourth Embodiment

In this embodiment, a cerium-based abrasive coated with both silicon and aluminum was produced. After the bastnasite-based cerium oxide raw material was loaded together with water into an attriter and pulverized to have the average particle diameter of 0.3 μm and after that, the slurry was transported to a receiving tank equipped with a stirring apparatus from the attriter and then an aqueous sodium silicate solution measured so as to contain silicon in 0.5% by weight in relation to the cerium oxide weight was added while being stirred. After the resulting slurry was stirred for 5 minutes after addition, the pH was adjusted to be 8 by a diluted sulfuric acid and controlled to keep the pH for 30 minutes. Further, an aqueous aluminum sulfate solution measured so as to contain aluminum in 0.25% by weight was added while being stirred. After the resulting slurry was stirred for 5 minutes after addition, the pH was adjusted to be 6 by a diluted sulfuric acid and controlled to keep the pH for 30 minutes. The obtained slurry was filtered, dried, roasted at 950° C. and pulverized and then the particles with a particle diameter of 10 μm or larger were removed to obtain a powder of the cerium-based abrasive particles. The obtained powder of the cerium-based abrasive particles was evaluated in the same manner as the first embodiment and the obtained results are shown in Table 1.

Fifth Embodiment

In this embodiment, a cerium-based abrasive coated with both silicon and aluminum was produced. After the bastnasite-based cerium oxide raw material was pulverized to have the average particle diameter of 0.3 μm in the same manner as the first embodiment, an aqueous aluminum sulfate solution measured so as to contain aluminum in 0.5% by weight in relation to the cerium oxide weight was added to the slurry while being stirred. After the resulting slurry was stirred for 5 minutes after addition, the pH was adjusted to be 6 by a diluted sulfuric acid and controlled to keep the pH for 30 minutes. Further an aqueous sodium silicate solution measured so as to contain silicon in 0.1% by weight was added while being stirred and after the resulting slurry was stirred for 5 minutes after addition, the pH was adjusted to be 8 by a diluted sulfuric acid and controlled to keep the pH for 30 minutes. The obtained slurry was filtered, dried, roasted at 950° C. and pulverized and then the particles with a particle diameter of 10 μm or larger were removed to obtain a powder of the cerium-based abrasive particles. The obtained powder of the cerium-based abrasive particles was evaluated in the same manner as the first embodiment and the obtained results are shown in Table 1.

Sixth Embodiment

In this embodiment, a cerium-based abrasive coated with silicon only was produced. After the bastnasite-based cerium oxide raw material was pulverized to have the average particle diameter of 0.3 μm in the same manner as the first embodiment, an aqueous aluminum sulfate solution measured so as to contain an aqueous sodium silicate solution measured so as to contain silicon in 1.0% by weight was added while being stirred and after the resulting slurry was stirred for 5 minutes after addition, the pH was adjusted to be 8 by a diluted sulfuric acid and controlled to keep the pH for 30 minutes. The obtained slurry was filtered, dried, roasted at 950° C. and pulverized and then the particles with a particle diameter of 10 μm or larger were removed to obtain a powder of the cerium-based abrasive particles. The obtained powder of the cerium-based abrasive particles-was evaluated in the same manner as the first embodiment and the obtained results are shown in Table 1.

Seventh Embodiment

In this embodiment, being different from the first to the sixth embodiments, in place of the bastnasite-based cerium oxide as a raw material, rare earth oxides containing 60% by weight or more of cerium oxide in the total rare earth oxides were used to produce an abrasive without carrying out surface treatment at first and after that the abrasive was subjected to the surface treatment. The production steps of the abrasive in this case were the same as those of the first to the sixth embodiments except that the surface treatment was carried out. That is, the raw materials were loaded together with water into an attriter and pulverized, and the resulting slurry was filtered, dried, roasted at 950° C. and pulverized and then the particles with a particle diameter of 10 μm or larger were removed. The obtained powder of the cerium-based abrasive particles was dispersed in pure water so as to adjust the slurry concentration to be 10% by weight and stirred and an aqueous sodium silicate solution was added so as to control the silicon element content to be 1% by weight in relation to the weight of the abrasive. At that time, the slurry was stirred for 30 minutes while being adjusted to be pH 8 by a diluted sulfuric acid of 0.1 mol/l concentration. After the stirring, the obtained slurry was filtered and washed to remove sodium ion and sulfate ion and obtain a cake. The cake was dried at 120° C. and pulverized to obtain the cerium-based abrasive. The obtained abrasive was also evaluated in the same manner as the first embodiment and the obtained results are shown in Table 1.

Eighth Embodiment

In this embodiment, a cerium-based abrasive was produced by the same method as the seventh embodiment and the abrasive was surface-treated. The cerium-based abrasive was dispersed in pure water so as to adjust the slurry concentration to be 10% by weight and stirred and an aqueous aluminum sulfate solution was added to the slurry so as to control the aluminum element content to be 1% by weight in relation to the weight of the abrasive. At that time, the pH of the slurry was adjusted to be 8. After the surface treatment, the obtained slurry was filtered and washed to obtain a cake. The cake was dried at 120° C. and pulverized to obtain the cerium-based abrasive. The obtained abrasive was also evaluated in the same manner as the first embodiment and the obtained results are shown in Table 1.

Ninth Embodiment

In this embodiment, surface treatment was carried out for a cerium-based abrasive by the same method as the seventh and the eighth embodiments. The cerium-based abrasive was dispersed in pure water so as to adjust the slurry concentration to be 10% by weight and stirred and an aqueous sodium silicate solution measured so as to control the silicon content to be 0.3% by weight in relation to the weight of the abrasive and an aqueous sodium aluminate solution measured so as to control the aluminum content to be 0.3% by weight were added to the slurry while being stirred. At that time, the pH of the slurry was adjusted to be 8. After the surface treatment, the obtained slurry was filtered and washed to obtain a cake and the cake was dried at 120° C. and pulverized to obtain the cerium-based abrasive. The obtained abrasive was also evaluated in the same manner as the first embodiment and the obtained results are shown in Table 1.

Tenth Embodiment

In this embodiment, surface treatment to coat a cerium-based abrasive with the silicon component and the aluminum component was carried out by the same method as the ninth embodiment. In this case, an aqueous sodium silicate solution measured so as to control the silicon content to be 0.5% by weight in relation to the weight of the abrasive and an aqueous sodium aluminate solution measured so as to control the aluminum content to be 0.3% by weight were added. The obtained powder of the cerium-based abrasive particles was also evaluated in the same manner as the first embodiment and the obtained results are shown in Table 1.

Eleventh Embodiment

Surface treatment to coat a cerium-based abrasive with the silicon component and the aluminum component was carried out by the same method as the ninth embodiment, except that an aqueous sodium silicate solution measured so as to control the silicon content to be 0.1% by weight in relation to the weight of the abrasive and an aqueous sodium aluminate solution measured so as to control the aluminum content to be 0.5% by weight were added. The obtained powder of the cerium-based abrasive particles was also evaluated in the same manner as the first embodiment and the obtained results are shown in Table 1.

Twelfth Embodiment

Surface treatment to coat a cerium-based abrasive with the silicon component was carried out by the same method as the ninth embodiment, except that an aqueous sodium silicate solution measured so as to control the silicon content to be 1.0% by weight in relation to the weight of the abrasive was added. The obtained powder of the cerium-based abrasive particles was also evaluated in the same manner as the first embodiment and the obtained results are shown in Table 1.

COMPARATIVE EXAMPLE 1

To be compared with the above-described first to twelfth embodiments, abrasive particles bearing no coating on the particle surface were produced by a common method. In the same manner as the first embodiment, the bastnasite-based cerium oxide raw material was used and loaded together with water into an attriter and pulverized to have the average particle diameter of 0.3 μm measured by a particle diameter measurement method which will be described later and the obtained slurry was filtered, dried, roasted at 950° C. and pulverized and then the particles with a particle diameter of 10 μm or larger were removed to obtain a powder of the cerium-based abrasive particles. The obtained powder of the cerium-based abrasive particles was evaluated in the same manner as the first embodiment and the obtained results are shown in Table 1. Further, the results of the life test are shown in Table 2.

COMPARATIVE EXAMPLE 2

A powder of abrasive particles was obtained in the same method as Comparative Example 1 by using rare earth oxides similar to those of the seventh to twelfth embodiments as a raw material in place of the raw material used in Comparative Example 1. The obtained powder of the cerium-based abrasive particles was evaluated in the same manner as the first embodiment and the obtained results are shown in Table 1.

TABLE 1

| | | | | | | | Polishing test result | | |
| | | | | | | | | Existence of remaining abrasive | |
| | Particle diameter (μm) | Dispersion time (min) | Si, Al contents | | Polishing value | Polished face evalua-tion | Only flowing water | Flowing water + ultra-sonic wave + flowing water |
| | | | Si (wt %) | Al (wt %) | | | | |
| First embodiment | 0.95 | 7 | 0.97 | 0 | 100 | 97 | Slightly existing | None |
| Second embodiment | 0.94 | 2 | 0 | 0.98 | 100 | 100 | None | None |
| Third embodiment | 0.94 | 4 | 0.29 | 0.30 | 100 | 99 | None | None |
| Fourth embodiment | 0.92 | 5 | 0.49 | 0.24 | 100 | 98 | Slightly existing | None |
| Fifth embodiment | 0.97 | 3 | 0.09 | 0.49 | 100 | 100 | None | None |
| Sixth embodiment | 0.95 | 5 | 0.98 | 0 | 100 | 99 | Slightly existing | None |
| Seventh embodiment | 1.03 | 5 | 0.94 | 0 | 102 | 99 | Slightly existing | None |
| Eighth embodiment | 0.99 | <1 | 0 | 0.91 | 100 | 100 | None | None |
| Ninth embodiment | 0.97 | 3 | 0.27 | 0.27 | 100 | 99 | None | None |
| Tenth embodiment | 0.99 | 4 | 0.50 | 0.25 | 100 | 100 | None | None |

TABLE 1-continued

| | | | | | | | Polishing test result | | |
| | | | | | | | | Existence of remaining abrasive | |
| | Particle diameter (μm) | Dispersion time (min) | Si, Al contents | | Polishing value | Polished face evalua-tion | Only flowing water | Flowing water + ultra-sonic wave + flowing water |
| | | | Si (wt %) | Al (wt %) | | | | |
| --- | --- | --- | --- | --- | --- | --- | --- | --- |
| Eleventh embodiment | 1.01 | 1 | 0.07 | 0.50 | 104 | 100 | None | None |
| Twelfth embodiment | 1.06 | 3 | 0.88 | 0 | 105 | 99 | Slightly existing | None |
| Comparative example 1 | 1.18 | >10 | 0 | 0 | 100 | 90 | Existing | Existing |
| Comparative example 2 | 1.12 | >10 | 0 | 0 | 100 | 92 | Existing | Existing |

*The value for the polishing value is relative value to 100 set for the value in Comparative Example 1.

TABLE 2

| | First object | 20th object | 50th object | 100th object |
| --- | --- | --- | --- | --- |
| First embodiment | 100 | 93 | 82 | 63 |
| Second embodiment | 100 | 98 | 93 | 84 |
| Comparative Example 1 | 100 | 85 | 67 | 34 |

*The value for the polishing value is relative value to 100 set for the value in Comparative Example 1.

From the above-described results, it was found that as compared with those for Comparative Example 1 and Comparative Example 2, the polishing values for First to Twelfth embodiments were not decreased for the slightly small average particle diameters. That is supposedly attributed to the fact that sintering of fine particles is suppressed at the time of roasting in those embodiments, resulting in small apparent average particle diameter. Further, regarding the evaluation results of the polished faces, the abrasives according to the embodiments were found capable of providing excellent polished faces with relatively slight scratches as compared with the abrasives of the comparative examples.

On the other hand, in the dispersibility test, the abrasives of First to Twelfth embodiments were found capable of being dispersed within a short time as compared with those of the comparative examples, showing small agglomerating force among particles. Further, silicon and aluminum components were found capable of being used for surface treatment at a high yield ratio relative to the silicon component and the aluminum component added by adjusting the pH at the time of surface treatment just like the embodiments. Especially, under the condition of the same addition amounts, the powder of the cerium-based abrasive particles coated with the aluminum component was found excellent in the dispersibility as compared with the powder of the cerium-based abrasive particles coated with the silicon component. Further, regarding the cleaning property after polishing, the abrasives coated with the silicon component and the aluminum component of the present invention were found excellent as compared with surface-untreated ones.

Incidentally, in the abrasive production process of First, Second, Seventh, and Eighth embodiments and Comparative Examples 1 and 2, the classification efficiency was measured to find 96%, 98%, 97%, and 98% for First, Second, Seventh, and Eighth embodiments, respectively, whereas 67% and 45% for Comparative examples 1 and 2, respectively. This is supposedly attributed to the fact that the abnormal particle growth at the time of roasting was suppressed and also the adhesive property to the inner walls of the pulverizer and the classifying apparatus was decreased owing to the formation of the coating layer for the raw materials of these embodiments after pulverization.

Further, regarding the life test, the abrasives of the embodiments, especially the abrasive of Second embodiment, showed relatively high polishing value even after polishing 100th object to be polished to make it clear that they had excellent durability.

Thirteenth Embodiment

In this embodiment, a coupling treatment agent layer was further formed on the cerium-based abrasive produced in First embodiment. As a silane coupling agent, γ-aminopropyltriethoxysilane was added in 0.5% by weight relative to the abrasive weight to the cerium-based abrasive and sufficiently mixed by a V-model blender and heated at 100° C. for 2 hours to cause coupling reaction.

After that, the angle of repose of the resulting cerium-based abrasive after the coupling treatment was measured to find it was 52 degrees. The angle of repose of a cerium-based abrasive which was not subjected to the coupling treatment was also measured to find it was 57 degrees. Consequently, the cerium-based abrasive according to First embodiment was found that the angle of repose was further lowered by carrying out coupling treatment and the fluidity could be improved.

INDUSTRIAL APPLICABILITY

As described above, the cerium-based abrasive particles coated with the silicon component and the aluminum component according to the invention are excellent in dispersibility and usable for polishing optical glass lens, a glass substrate, a glass substrate for magnetic recording disks, a glass substrate for liquid crystals, a silicon-based semiconductor substrate or LSI, an aluminum substrate for magnetic recording disks or the like, and particularly for polishing purposes for which precision is required.

What is claimed is:

1. A cerium abrasive for polishing a glass, containing cerium oxide as a main component, wherein abrasive particles composing the abrasive have an average particle diameter of 0.1 to 10 μm and wherein said abrasive particles are coated with at least one coating layer consisting essentially of an inorganic silicon compound; an inorganic aluminum compound; or a combination thereof, wherein said abrasive particles are further provided with a coupling treatment agent layer, produced from a coupling agent, on the surface of the coating layer, wherein said coupling agent forming the coupling treatment agent layer contains at least one kind of coupling agent selected from an aluminum coupling agent, a zirconia coupling agent and a titanate coupling agent.

2. A cerium abrasive slurry containing the cerium abrasive according to claim 1.

3. A method for producing cerium abrasive particles for polishing a glass, the particles containing cerium oxide as a main component and having an average particle diameter of 0.1 to 10 μm, wherein said abrasive particles are coated with at least one coating layer consisting essentially of an inorganic silicon compound; an inorganic aluminum compound; or a combination thereof, wherein the method comprises a slurry production step of producing a slurry by mixing abrasive raw material with a dispersion medium, a pulverization step of wet pulverizing the slurry, a roasting step of roasting the abrasive raw material after said wet pulverization step, dry pulverizing the roasted abrasive raw material, and a classification step of classifying the roasted abrasive raw material after the raw material is dry-pulverized, and wherein during the wet pulverization step or after the wet pulverization step, a treatment solution containing a) an inorganic silicon compound; b) an inorganic aluminum compound; or c) a combination thereof is added to the slurry to carry out surface treatment.

4. The method according to claim 3, wherein said dispersion medium contains water as a main component.

5. A method of producing the abrasive according to claim 1, comprising the steps of mixing th cerium abrasive produced by the steps of producing a slurry by wet-dispersing the cerium abrasive in a dispersion medium and carrying out surface treatment by adding a treatment solution containing a) an inorganic silicon compound; b) an inorganic aluminum compound; or c) a combination thereof to the slurry with a coupling agent and heating them.

6. The method according to claim 5, wherein the cerium abrasive is dispersed in water or an organic solvent to produce a slurry and a coupling agent is added to and mixed with the slurry.

7. The method according to claim 5, wherein said coupling agent is mixed in a ratio of 0.1 to 5% by weight to the weight of the cerium abrasive.

8. A method of producing cerium abrasive particles for polishing a glass, the particles containing cerium oxide as a main component and having an average particle diameter of 0.1 to 10 μm, wherein said abrasive particles are coated with at least one coating layer consisting essentially of an inorganic silicon compound; an inorganic aluminum compound; or a combination thereof, wherein said method comprises the steps of producing a slurry by wet-dispersing the cerium abrasive in a dispersion medium and carrying out surface treatment by adding to the slurry a treatment solution containing a) an inorganic silicon compound; b) an inorganic aluminum compound; or c) a combination thereof, wherein the cerium abrasive is further subjected to a roasting step after the surface treatment step.

* * * * *